(12) United States Patent
Hirota et al.

(10) Patent No.: US 11,402,006 B2
(45) Date of Patent: Aug. 2, 2022

(54) DIFFERENTIAL DEVICE

(71) Applicant: GKN Automotive Limited, Birmingham (GB)

(72) Inventors: Isao Hirota, Tochigi (JP); Manabu Endou, Tochigi (JP); Masato Horiguchi, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/342,646

(22) Filed: Jun. 9, 2021

(65) Prior Publication Data
US 2021/0293316 A1 Sep. 23, 2021

Related U.S. Application Data

(63) Continuation of application No. PCT/JP2019/041738, filed on Oct. 24, 2019, which is
(Continued)

(51) Int. Cl.
*F16H 48/22* (2006.01)
*F16H 48/08* (2006.01)
(Continued)

(52) U.S. Cl.
CPC .......... *F16H 48/22* (2013.01); *F16H 48/08* (2013.01); *F16H 48/24* (2013.01); *F16H 48/34* (2013.01);
(Continued)

(58) Field of Classification Search
None
See application file for complete search history.

(56) References Cited

U.S. PATENT DOCUMENTS 5,098,360 A * 3/1992 Hirota ............... F16H 48/24
475/237
5,102,378 A * 4/1992 Gobert ............... F16H 48/22
475/249
(Continued)

FOREIGN PATENT DOCUMENTS

CN 1661263 A 8/2005
CN 105960539 A 9/2016
(Continued)

OTHER PUBLICATIONS

International Search Report and Written Opinion for PCT/JP2019/041738 dated Dec. 10, 2019 (8 pages; with English translation).

*Primary Examiner* — Ernesto A Suarez
*Assistant Examiner* — James J Taylor, II
(74) *Attorney, Agent, or Firm* — Bejin Bieneman PLC

(57) ABSTRACT

A differential device is provided with a casing rotatable about an axis, a differential gear set coupled therewith including a pinion gear with a pressure angle (a4) and side gears in mesh therewith, output members respectively mediating torque transmission from the side gears to axles, each of which includes a friction face as a friction clutch for limiting the differential motion, dog teeth, and an oblique face forming an angle (a1) and constituting a cam for operating the friction clutch, a clutch member axially movable for functioning as a clutch to lock the differential motion and including a leg having a side face forming an angle (a2) to function as a cam and movable dog teeth each forming an angle (a3) satisfying an inequality a2≥a3; and an actuator capable of driving the clutch member toward a position where the movable dog teeth mesh with the dog teeth.

7 Claims, 11 Drawing Sheets

Related U.S. Application Data a continuation-in-part of application No. PCT/JP2018/046677, filed on Dec. 19, 2018.

(51) Int. Cl.
    *F16H 48/24*     (2006.01)
    *F16H 48/40*     (2012.01)
    *F16H 48/34*     (2012.01)

(52) U.S. Cl.
    CPC ....... *F16H 48/40* (2013.01); *F16H 2048/346* (2013.01)

(56) References Cited

U.S. PATENT DOCUMENTS

| | | | |
|---|---|---|---|
| 9,651,131 B2 * | 5/2017 | Raghavan | F16D 27/118 |
| 2002/0155913 A1 | 10/2002 | Fusegi et al. | |
| 2003/0121750 A1 * | 7/2003 | Teraoka | F16H 48/22 192/93 A |
| 2003/0162622 A1 | 8/2003 | Fusegi et al. | |
| 2005/0187063 A1 | 8/2005 | Haruki et al. | |
| 2005/0277510 A1 | 12/2005 | Fusegi et al. | |
| 2016/0341294 A1 | 11/2016 | Inose et al. | |
| 2018/0306297 A1 | 10/2018 | Komatsu | |

FOREIGN PATENT DOCUMENTS

| | | |
|---|---|---|
| DE | 10216290 A1 | 11/2002 |
| EP | 1568917 A2 | 8/2005 |
| EP | 3106695 A1 | 12/2016 |
| JP | 2003-322240 A | 11/2003 |
| JP | 2004076845 A | 3/2004 |
| JP | 2005-240861 A | 9/2005 |
| JP | 2006-052860 A | 2/2006 |
| JP | 2008-286408 A | 11/2008 |
| KR | 2002-0080278 A | 10/2002 |
| WO | 2010/078937 A1 | 7/2010 |
| WO | 2015121967 A1 | 8/2015 |

\* cited by examiner

DIFFERENTIAL DEVICE

CROSS-REFERENCE TO RELATED APPLICATIONS

This application is a continuation Application of and claims priority from PCT International Application No. PCT/JP2019/041738 (filed Oct. 24, 2019), which in turn is a continuation-in-part of and claims priority from PCT International Application No. PCT/JP2018/046677 (filed Dec. 19, 2018), which applications are hereby incorporated herein by reference in their entireties.

BACKGROUND

As right and left axles in a vehicle do not necessarily rotate in an equal speed, it is required to allow differential motion therebetween. To transmit torque to both the axles while enabling differential motion therebetween, a differential device is used.

In a case where either a right or left driving wheel loses traction, the differential device will run idle and then lose an ability to transmit torque even to the other driving wheel. To avoid such a situation, some differential devices comprise mechanisms for limiting differential motion. One example thereof is an electronically controlled limited slip differential (LSD) with a multiplate clutch. Where the pressure force acting on the multiplate clutch is increased or decreased under electronic control, the degree of limiting the differential motion is accordingly changed. Further, if any sufficient pressure force is applied thereto, the multiplate clutch is prevented from slipping. The device could realize so-called differential lock. PCT International Publication WO 2010/078937 A1 discloses a related art.

SUMMARY

The present disclosure includes a differential device capable of limiting and locking differential motions thereof including a limited-slip differential device with a structure enabling size reduction.

A multiplate clutch requires a considerable volume in the aforementioned electronically controlled LSD, and further a device for applying a pressure force such as a hydraulic device or a solenoid is combined therewith. These factors cause some difficulty in application of the electronically controlled LSD to a light-weight vehicle, such as a vehicle falling into a category of a microcar or a buggy, which brings poor dimensional flexibility about a span between axles.

According to an aspect of the present disclosure, a differential device for delivery of torque around an axis to axles, is provided with: a casing rotatable about the axis and receiving the torque; a differential gear set including a pinion gear and side gears in mesh with the pinion gear with a pressure angle (a4), the differential gear set being drivingly coupled with the casing to transmit the torque from the pinion gear to the side gears with allowing differential motion; output members respectively mediating torque transmission from the side gears to the axles, each of the output members including a friction face pressed onto an internal face of the casing to constitute a friction clutch configured to limit the differential motion, dog teeth, and an oblique face forming an angle (a1) with a direction of the axis, the oblique face being in mesh with any of the side gears to constitute a cam configured to convert the torque partly into a thrust force to press the friction face onto the internal face of the casing; a clutch member movable in the direction of the axis and in combination with one of the output member constituting a clutch to lock the differential motion, the clutch member including a leg having a side face forming an angle (a2) with the direction of the axis and movable dog teeth, the leg at the side face engaging with the casing to constitute a cam, each of the movable dog teeth forming an angle (a3) with the direction of the axis; and an actuator capable of driving the clutch member toward a position where the movable dog teeth mesh with the dog teeth, wherein the angles at least satisfy an inequality a2≥a3.

DESCRIPTION OF EXEMPLARY EMBODIMENTS

Exemplary embodiments will be described hereinafter with reference to the appended drawings. Throughout the following description and the appended claims, an axis means a rotational axis of a differential device, an axial direction means a direction parallel thereto, and a radial direction means a direction perpendicular thereto unless otherwise described.

Figure 1:
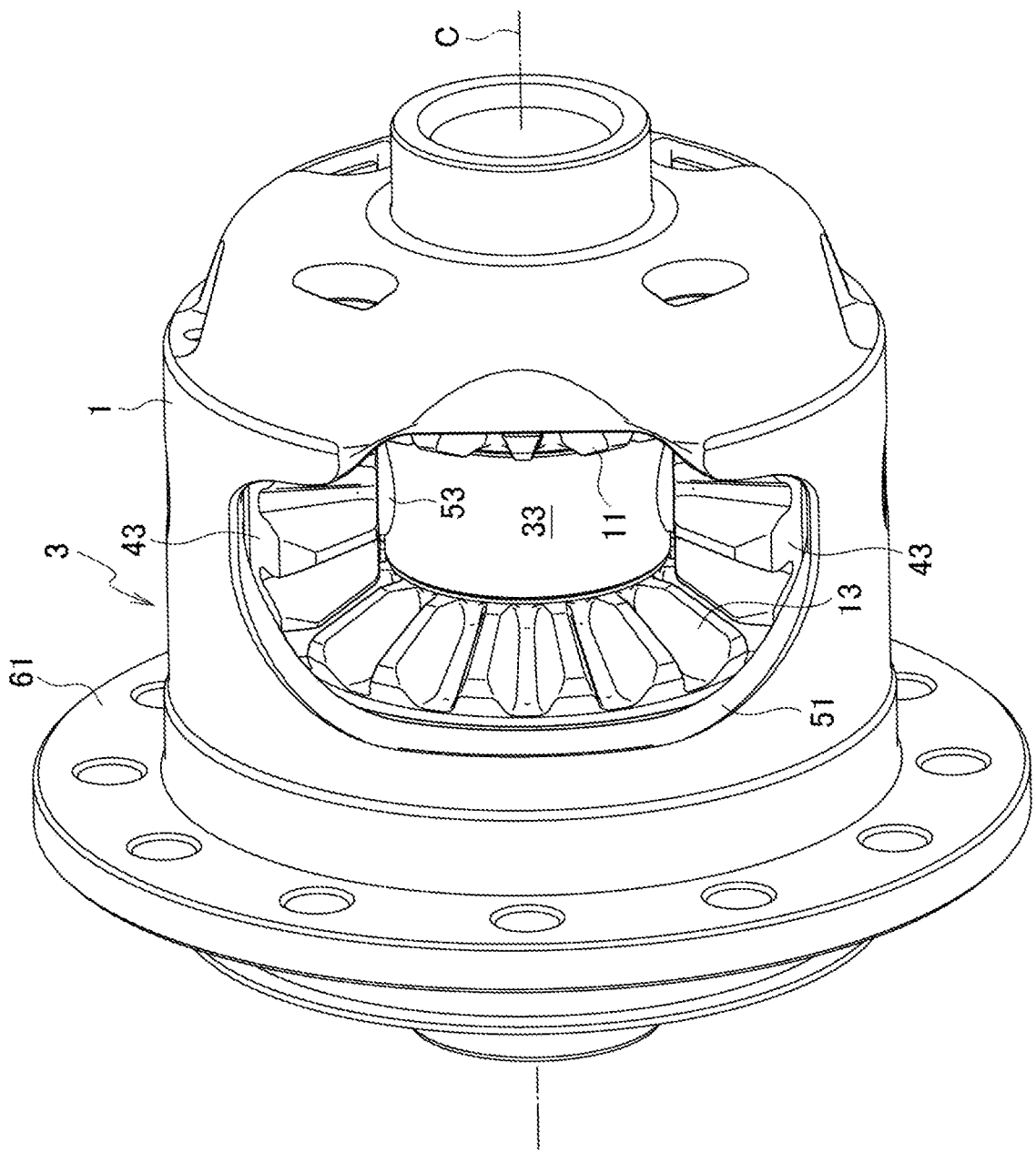
FIG. 1 is a perspective view of a differential device according to an embodiment.

Referring to FIG. 1 for example, a differential device according to the present embodiment is applicable to a use for delivering torque around an axis C to a pair of (usually, right and left) axles with allowing differential motion therebetween. Or, it is also applicable to a use for distributing torque to front and rear axles when intervening in a propeller shaft that connects the front axles with the rear axles, and still applicable to various other uses for delivering torque, of course. While the following description relates to an example where it distributes torque to axles, this is no more than convenience of explanation.

Figure 2:
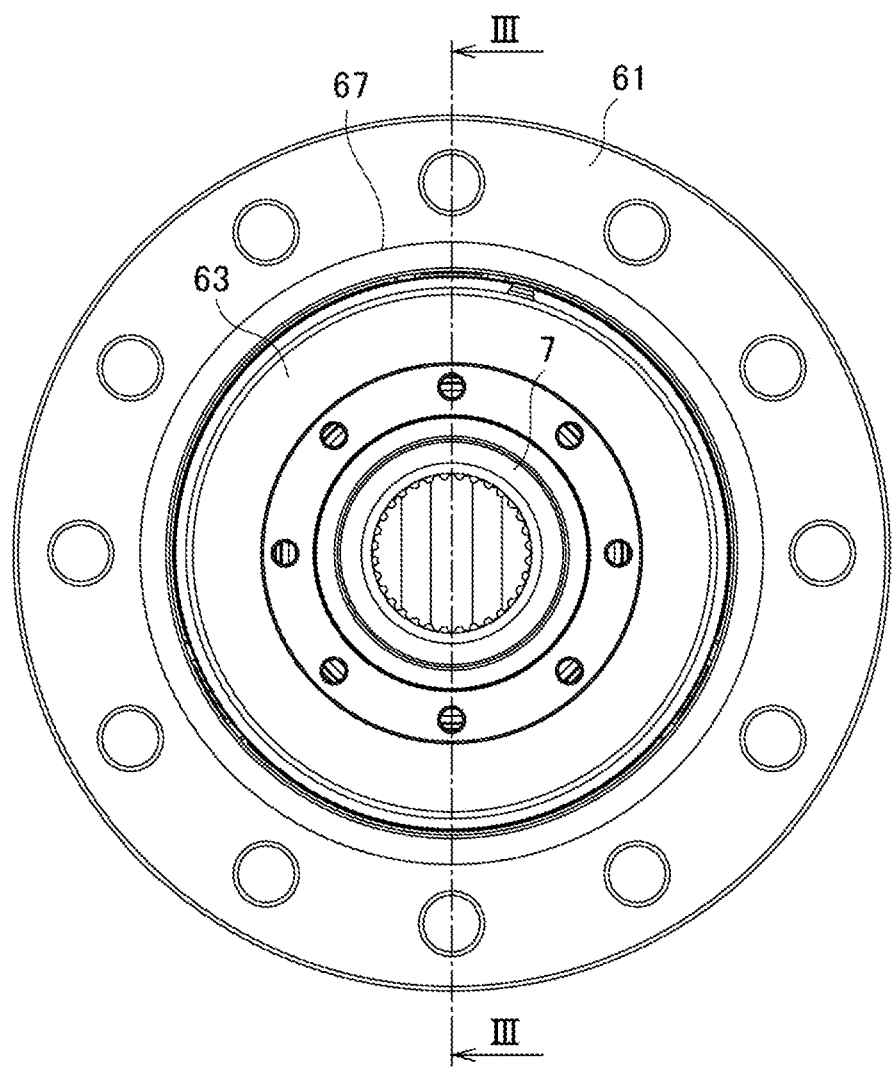
FIG. 2 is a side view of the differential device viewed from the side of its actuator.
Figure 3:
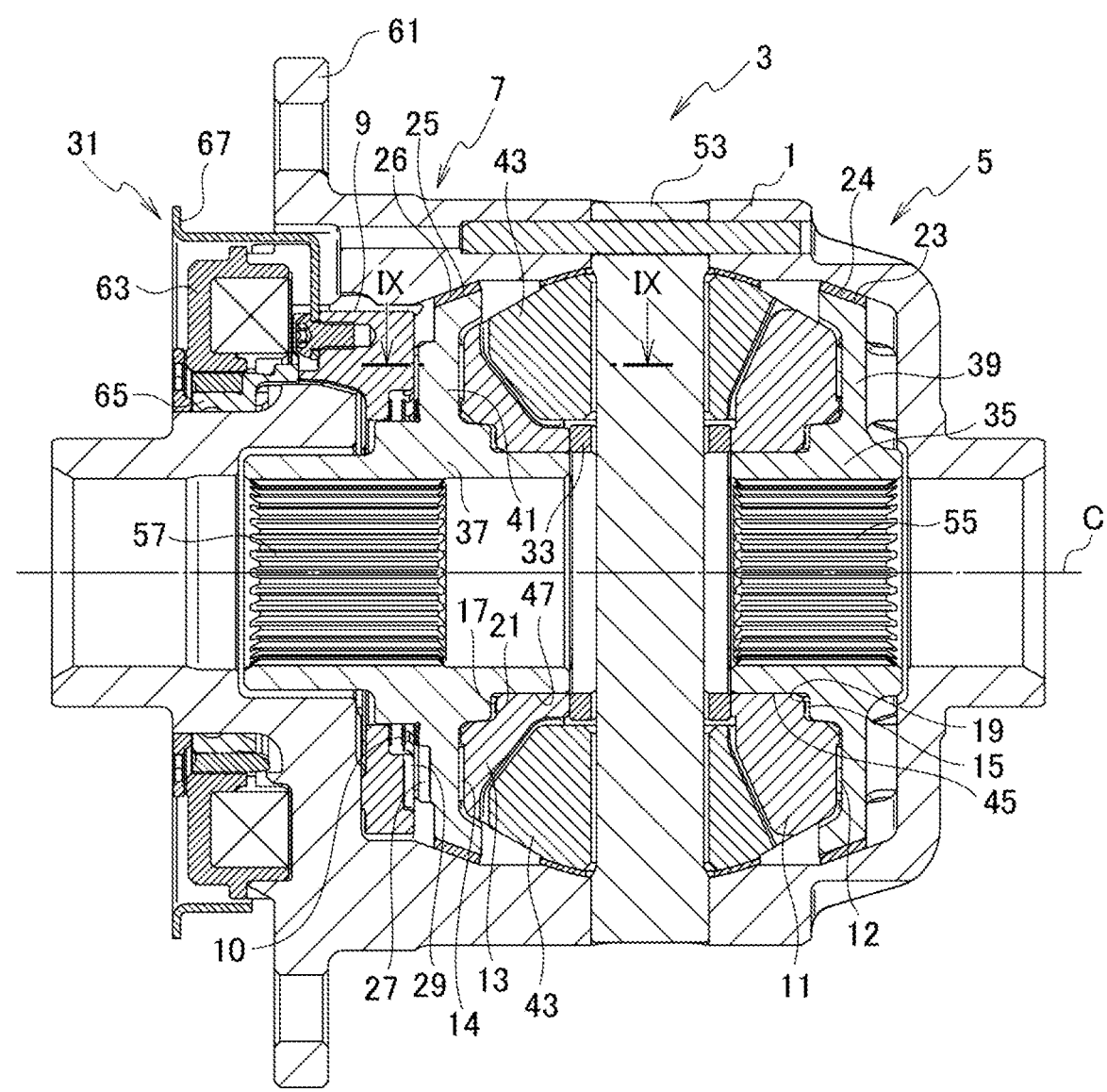
FIG. 3 is an elevational sectional view of the differential device, taken from the line of FIG. 2.

Referring to FIGS. 2 and 3 in combination with FIG. 1, the differential device is in general composed of a casing 1 receiving torque to rotate about the axis C, a differential gear set drivingly coupled with the casing 1 to transmit the torque with allowing differential motion, output members 5, 7 respectively outputting the transmitted torque to the axles, a clutch member 9 for locking one of the outputting members 7 on the casing 1, and an actuator 31 for driving the clutch member 9.

The casing 1 is generally cylindrical and is rotatably supported by means of boss portions projecting from both ends thereof. The casing 1 may be provided with a flange 61 projecting radially outward from an outer periphery of its cylindrical portion, and can receive torque through a ring gear coupled therewith, whereas reception of the torque may not necessarily be made by such a structure. Further, the casing 1 may be in a two-piece form in which the casing can be divided into plural parts in order to carry internal members therein, or may be in a one-piece form as shown in FIG. 1. In a case of the one-piece form, it may be provided with openings 51 on its side face and the internal members are carried therein through the openings 51.

The differential gear set 3 is provided with a pair of side gears 11, 13 in accordance with the pair of axles. The differential gear set 3 is provided with a pinion shaft 53 drivingly coupled with the casing 1 and a plurality of pinion gears 43 supported by and rotatable about the shaft 53. As the pinion gears 43 respectively mesh with the side gears 11, 13, the torque is transmitted to the pair of side gears 11, 13 with allowing differential motion therebetween.

Figure 4:
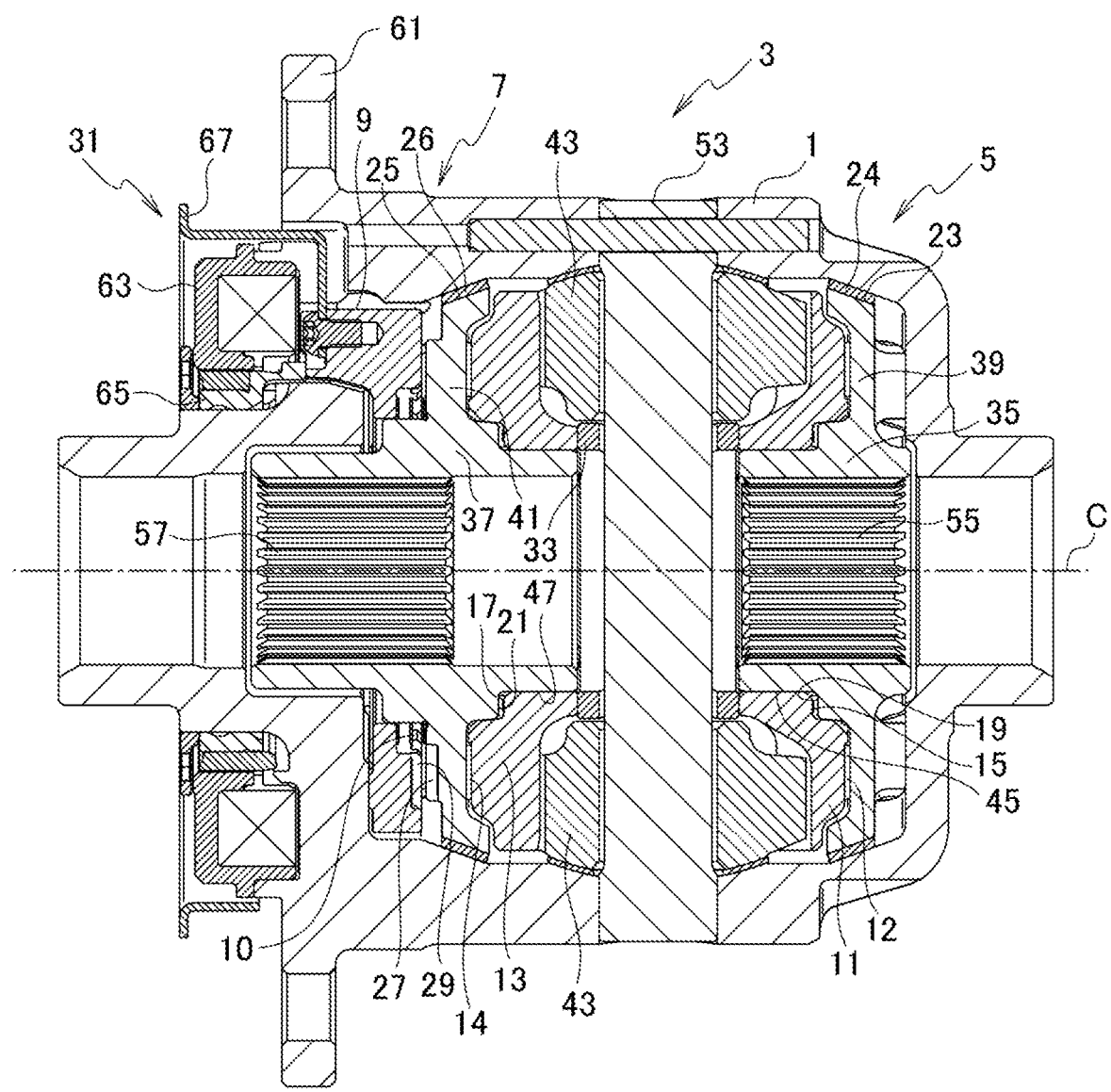
FIG. 4 is an elevational sectional view of the differential device according to another embodiment.

The differential gear set 3 may be, as illustrated in FIG. 1, 3, in a so-called bevel gear type where gear teeth of the pinion gears and the side gears are both beveled, or alternatively it may be a face-gear type as illustrated in FIG. 4. Although both the bevel gear type and the face-gear type could readily embody what is disclosed hereinafter, any other type may be applied if possible.

In any case, while the side gears 11, 13 may be coupled directly with the axles, unlike ordinary differential gears, they may not be directly coupled with but isolated from the axles respectively. What mediate torque transmission between the side gears 11, 13 and the axles are a pair of output members 5, 7 that are unitary or separate bodies from the side gears 11, 13.

The output members 5, 7 are respectively composed of hubs 35, 37 and flange portions 39, 41 respectively spreading radially outward from the hubs 35, 37. On outer peripheries 45, 47 of the hubs 35, 37 fitted respectively are the side gears 11, 13, and with inner faces 55, 57 thereof coupled respectively are the axles. For the coupling with the axles, the inner faces 55, 57 are for example provided with splines but not limited thereto.

While details will be described later, the side gears 11, 13 and the output members 5, 7 are, in a case where they are separate bodies, provided with structures for mutual meshing to enable torque transmission. More specifically, in either case of separate or unitary bodies, the torque output by the side gears 11, 13 is transmitted through the output members 5, 7 to the axles.

Outer peripheries of the flange portions 39, 41 are cone faces 23, 25 that form conical faces, and the flange portions 39, at these faces are capable of butting directly against the internal faces of the casing 1. Alternatively, any proper friction rings 24, 26 may be interposed therebetween and internal faces of the friction rings 24, 26 may form conical faces fittable onto the cone faces 23, 25. The flange portions 39, 41, via the friction rings 24, 26, butt against the inner faces of the casing 1. The friction rings 24, 26 may be rotatable relative to the casing 1 but alternatively may be provided with any latching portions to bring about anti-rotation relative to the casing 1.

As shown in FIGS. 3, 4, corresponding to the cone faces 23, 25, the inner faces of the casing 1 may form conical faces. In any case, the cone faces 23, 25 when pressed onto the inner faces of the casing 1 can limit the differential motion and, more specifically, the combination of the output member 5 or 7 and the casing 1 functions as a friction clutch (cone clutch).

The above description relates to a cone clutch using a cone face as a friction face but it is nothing more than an explanatory convenience. In place of the cone clutches, the combination of the output members 5, 7 and the casing 1 may constitute another type of clutches such as disc clutches or drum clutches. Further, needless to say, multi-plate clutches are applicable thereto.

Figure 5:
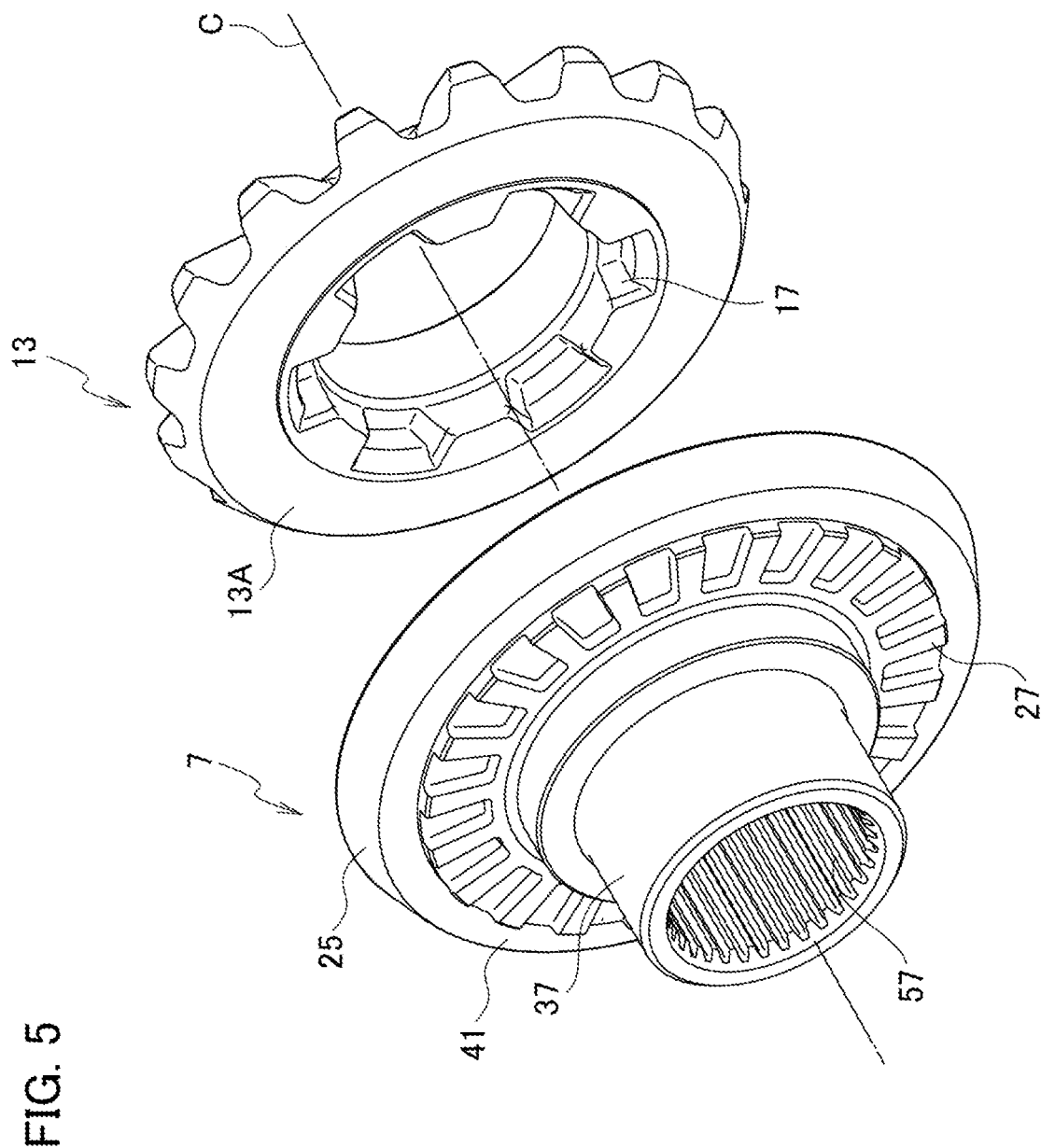
FIG. 5 is an exploded perspective view in which an output member and a side gear are taken out of the device.
Figure 6:
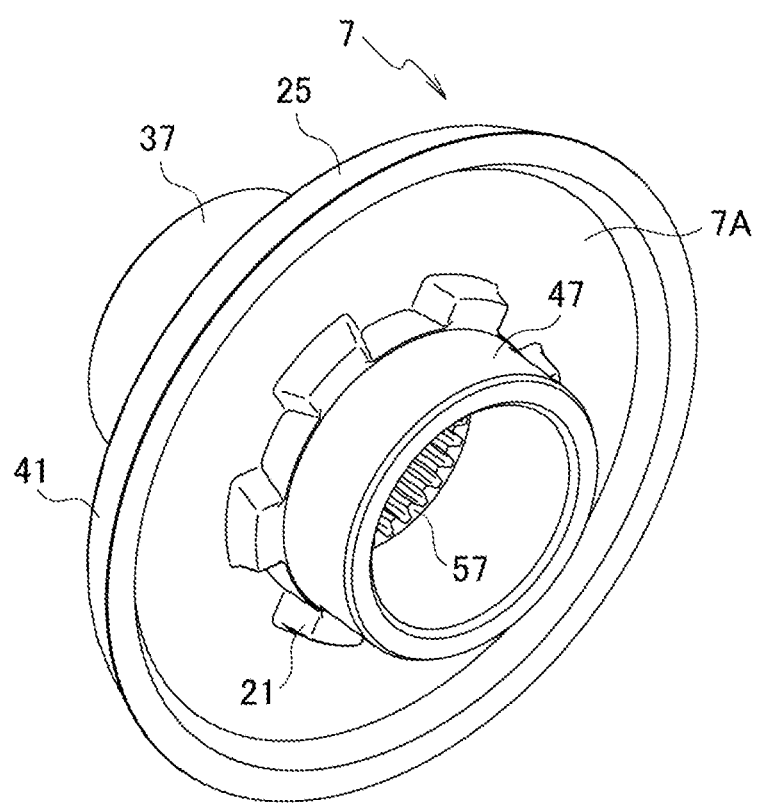
FIG. 6 is a perspective view of the output member, which shows a face thereof opposed to the side gear.

Referring to FIG. 5 in combination with FIGS. 3, 4, the side gears 11, 13 are respectively provided with sockets 15, 17, each of which a for example a hollow opened axially outward. Referring to FIG. 6 instead of FIG. 5, in combination with FIGS. 3, 4, the output members 5, 7 are respectively provided with lugs 19, 21 in accordance with the sockets 15, 17. The lugs 19, 21 are so disposed and dimensioned as to respectively fit in the sockets 15, 17, so that the output members 5, 7 are respectively in mesh with the side gears 11, 13.

Side faces of the lugs 19, 21 are respectively tapered toward the side gears 11, 13, more specifically oblique axially inward. Correspondingly, side faces of the sockets 15, 17 are respectively widened toward the output members 5, 7, more specifically oblique axially outward. More specifically, the side faces of the lugs 19, 21 and the sockets 15, 17 in contact with each other are slanted relative to the axial direction.

Figure 8A:
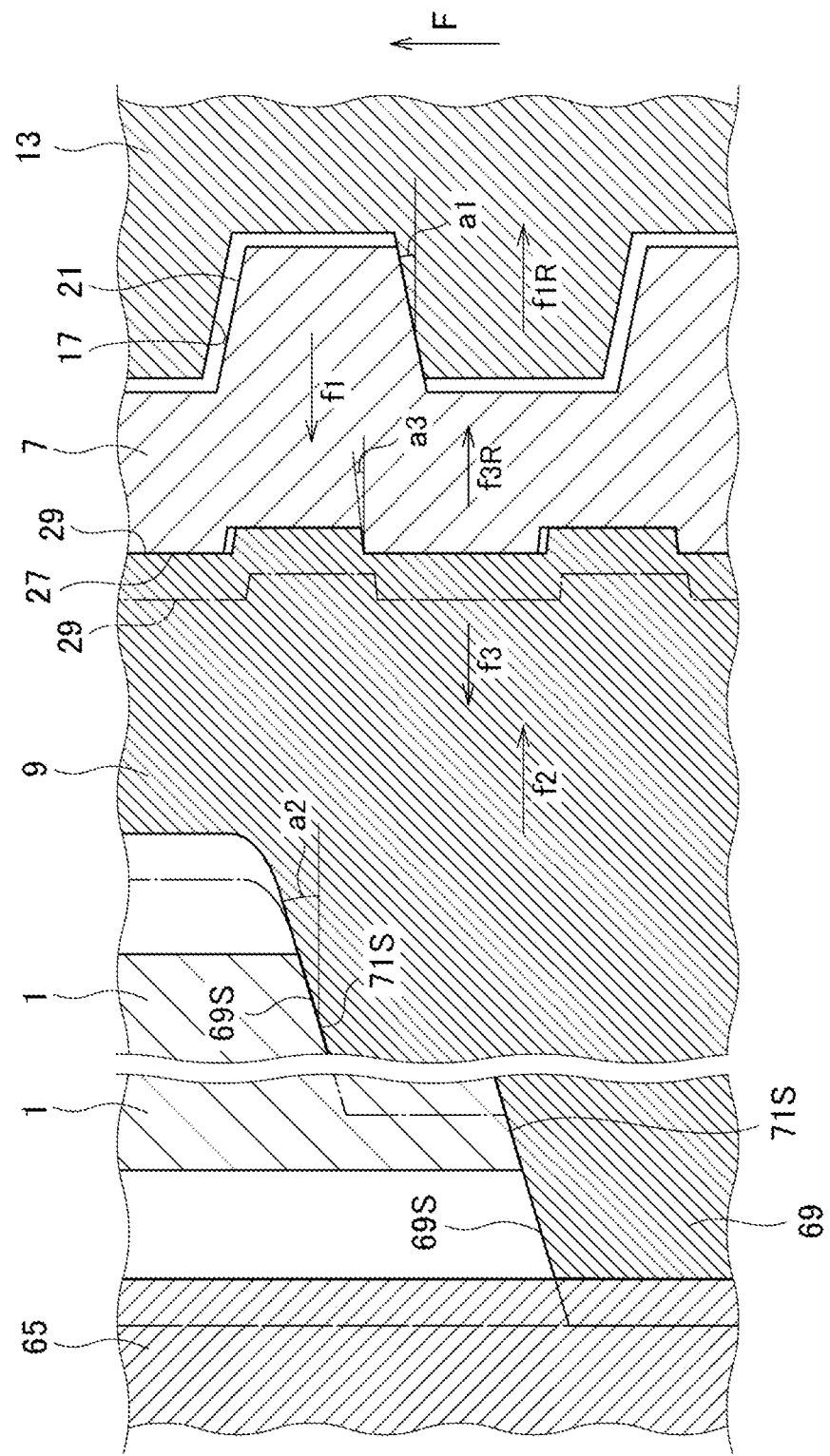
FIG. 8A is a schematic sectional view showing a relation among a plunger, the clutch member, a casing, the output member and the side gear.

As being understood from FIG. 8A, as these side faces are slanted relative to the axial direction, when torque F is applied to the side gears 11, 13, the torque F is partly converted into thrust force f1 directed axially outward. This thrust force f1 pushes the output members 5, 7 axially outward. The combination of the side gears 11, 13 and the output members 5, 7 thus constitutes a cam for pressing the cone faces 23, 25 onto the internal faces of the casing 1.

Further, repulsive bodies 12, 14 such as coned-disc springs may be added. These repulsive bodies 12, 14 may be interposed between the side gears 11, 13 and the output members 5, 7 as shown in FIGS. 3, 4, or may intervene in any proper space. These repulsive bodies 12, 14 steadily, whether the cam in in action or not, press the cone faces 23, 25 onto the internal faces of the casing 1 to generate initial torque. These repulsive bodies 12, 14 may be used in addition to, or in place of, the aforementioned cam.

Because the thrust force generated by these structures makes the aforementioned friction clutches operate in a torque-sensitive way, the differential device functions as a torque-sensitive LSD.

Alternatively, while engagement of the side gears 11, 13 with the pinion gears 43 generates reaction force directed axially outward, this reaction force may be used to embody the torque-sensitive LSD. In this case, the cam and/or the repulsive bodies may be omitted and further the side gears 11, 13 and the output members 5, 7 may be formed in unitary bodies respectively.

Referring again to FIG. 8A, the angles formed by the side faces of the lugs 19, 21 and the sockets 15, 17 and the direction of the axis C can be determined properly in accordance with required pressure force, or more specifically, required slip-limiting force for the differential motion. As the angle a1 is made smaller, the slip-limiting force gets smaller. Adversely, as it's made larger, the slip-limiting force gets larger. The angle a1 is, although not limited to, 5 degrees or larger and 20 degrees or smaller for example. The angles of both sides may be either identical or differentiated, and further one of the sides may be degree. To differentiate the angles of both sides enables differentiation of the slip-limiting force in a forward direction from that in a reverse direction.

Thrust reaction force f1R created in response to the thrust force f1 acts respectively on the side gears 11, 13. The thrust reaction force f1R acting on the side gear 11 is equal in strength to the thrust reaction force f1R acting on the side gear 13, but is opposite in direction. The differential device may be further provided with a block 33 to slide both on the side gears 11, 13, which can cancel out the thrust reaction forces f1R acting on the side gears 11, 13. The block 33 is, as best illustrated in FIG. 1, a cylinder around the axis C for example, which is provided with through holes through which the pinion shaft 53 passes but is not limited to such a shape.

It is particularly noted here that, while the side gears 11, 13 receive reaction force axially outward from the engagement with the pinion gears 43, the thrust reaction force f1R is directed against this reaction force and further the side gears 11, 13 are supported by the block 33, thereby axially stabilizing positions of the side gears 11, 13. The engagement between the side gears 11, 13 and the pinion gears 43 is thus stable even if the torque F is enhanced, and resultantly instability of gear operations and damage on gear teeth are both effectively prevented. As compared with the case where the side gears by itself function as friction clutches, these points are advantageous effects.

The above exemplary illustration of the relation between the sockets and the lugs is given merely for convenience of explanation. Contrary to the above illustration, the side gears may have lugs and the output members have sockets. Alternatively, any other structure is applicable as long as the structure sets these components in mesh together to function as a cam.

The sockets 15, 17 may be formed (but are not limited to being so formed) along inner faces that fit on the outer peripheries 45, 47, as best shown in FIG. 5. Correspondingly, the lugs 19, 21 may be, as best shown in FIG. 6, formed as projections projecting radially outward respectively from the hub 35, 37. This structure is convenient in terms of machining and is helpful in particular to increase strength and rigidity.

The aforementioned structure makes a broad face (sign 7A in FIG. 6) on the output member, extending radially outward from the lugs, available for support for a broad face (sign 13A in FIG. 5) on the side gear, extending radially outward from the sockets. This face 7A may be a depression falling inward in the output member 7 and can, as being understood from FIG. 3, accommodate the bottom portion of the side gear 13. Needless to say, this structure is also applicable to the side gear 11 and the output member 5.

This structure is helpful to shrink the axial size of the combination of the side gear and the output member. Further, as the outline of this combination is substantially identical to the outline of the prior side gear, it provides excellent compatibility among parts.

Referring mainly to FIG. 5, at least one output member 7 from the pair of output members 5, 7 is further provided with dog teeth 27. These dog teeth 27 are formed on a face opposite to the face 7A receiving the side gear 13.

Figure 7A:
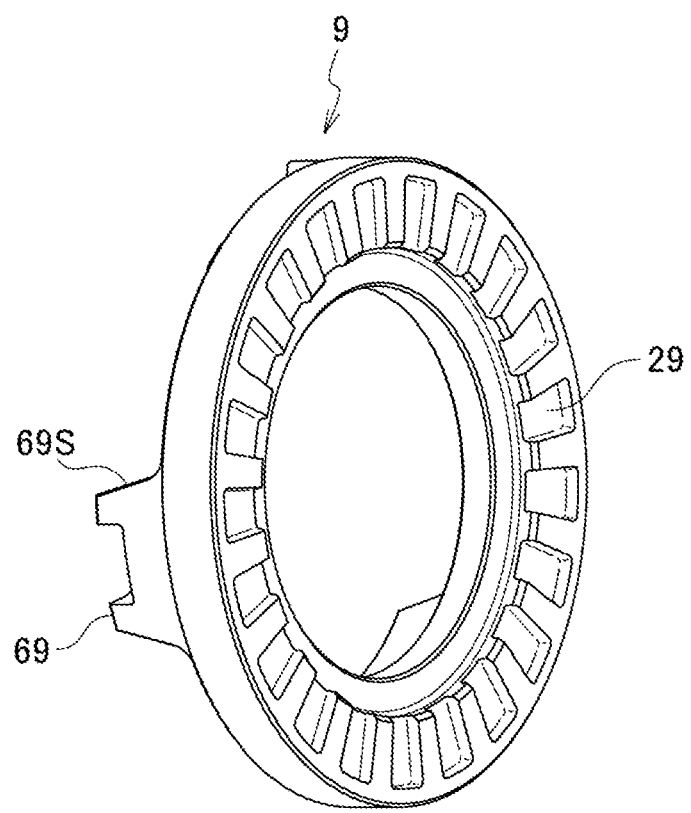
FIG. 7A is a perspective view of a clutch member, which shows a face thereof opposed to the output member.

Referring to FIG. 7A in combination with FIGS. 3, 4, the differential device is further provided with a clutch member 9 in order to lock the output member 7 on the casing 1. The clutch member 9 is an axially movable member and is provided with dog teeth 29 on a face directed to the output member 7. The dog teeth 27 are so formed as to mesh with the dog teeth 27 of the output member 7. The clutch member 9 is further provided with one or more legs 69 projecting axially from a face opposite to the dog teeth 29, which engage with through holes passing through the casing 1 and are further, through the through holes, exposed to the exterior.

Referring to FIG. 2 in combination with FIGS. 3, 4, the actuator 31 is, to drive the clutch member 9 from the exterior, installed on the outside of the casing 1. Any proper mechanism is applicable to the actuator 31 as long as it can exert thrust force and its example is a solenoid, a hydraulic mechanism, a gear mechanism, a cam mechanism, or a screw mechanism. Descriptions will be given hereinafter in regard to an example where a solenoid 63 of a ring-like shape around the axis C but it's not limiting. Although the solenoid 63 in the following example drives the clutch member 9 via a plunger 65, needless to say, the solenoid 63 by itself may move axially to drive the clutch member 9.

While the solenoid 63 is in contact with the casing 1 and is thus adjacent to the legs 69 of the clutch member 9 exposed to the exterior of the casing 1, it is anti-rotated so as not to be rotatable about the axis C. In the solenoid 63 a core encloses its coiled line so as to conduct magnetic flux, and a plunger 65 lies contiguous to a gap in the core and thus fits in the solenoid. The plunger 65 is movable and, as it is partly of a magnetic material and the magnetic flux bypasses the gap, is driven in the direction of the axis C.

One end of the plunger 65 is in contact with the legs 69 and, as the solenoid drives the plunger 65, the clutch member 9 is pressed and driven thereby. The actuator 31, as illustrated in FIG. 8A, drives the clutch member 9 from a position where the clutch member 9 is apart from the output member 7 (shown by chain lines) to a position where the dog teeth 29 are in mesh with the dog teeth 27 (shown by solid lines).

Figure 7B:
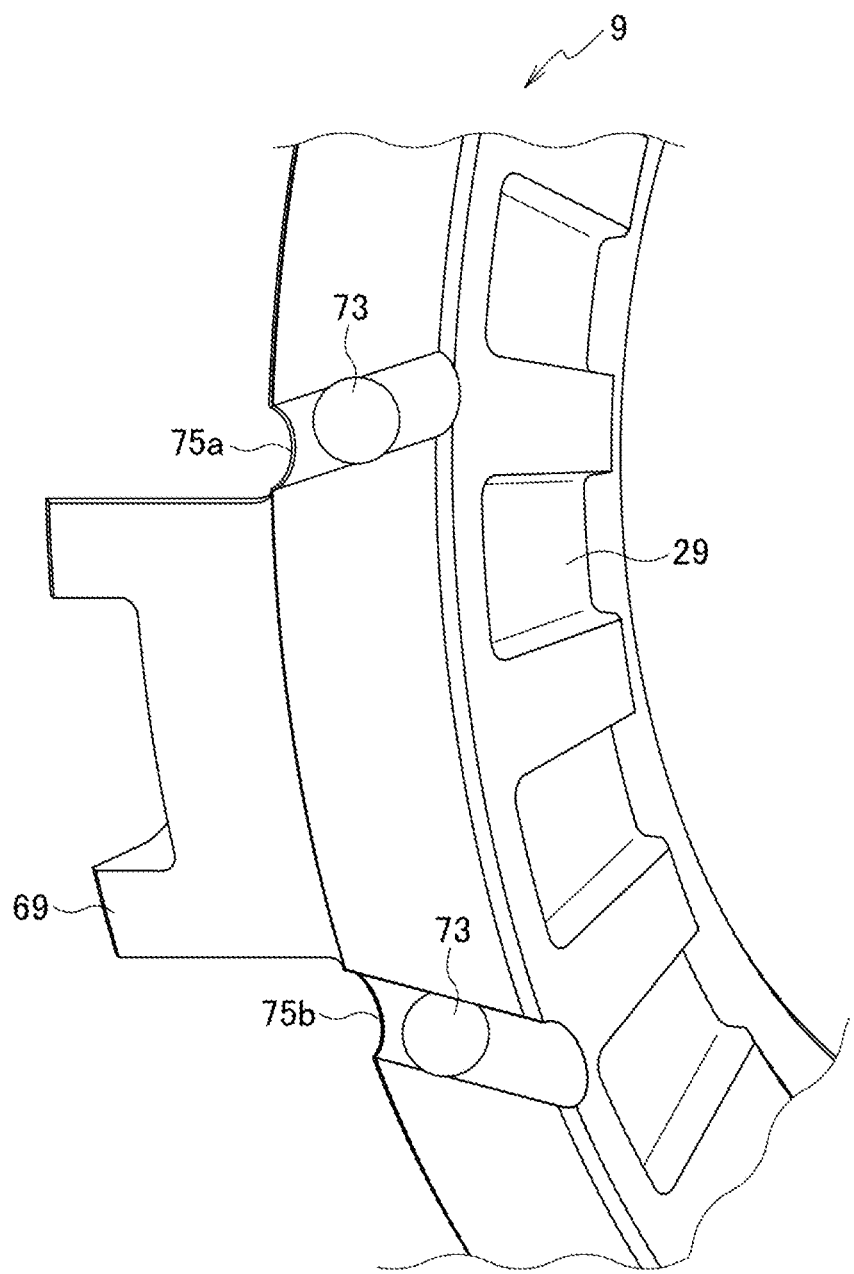
FIG. 7B is a partial perspective view of the clutch member, which mainly shows a cam with balls.
Figure 8B:
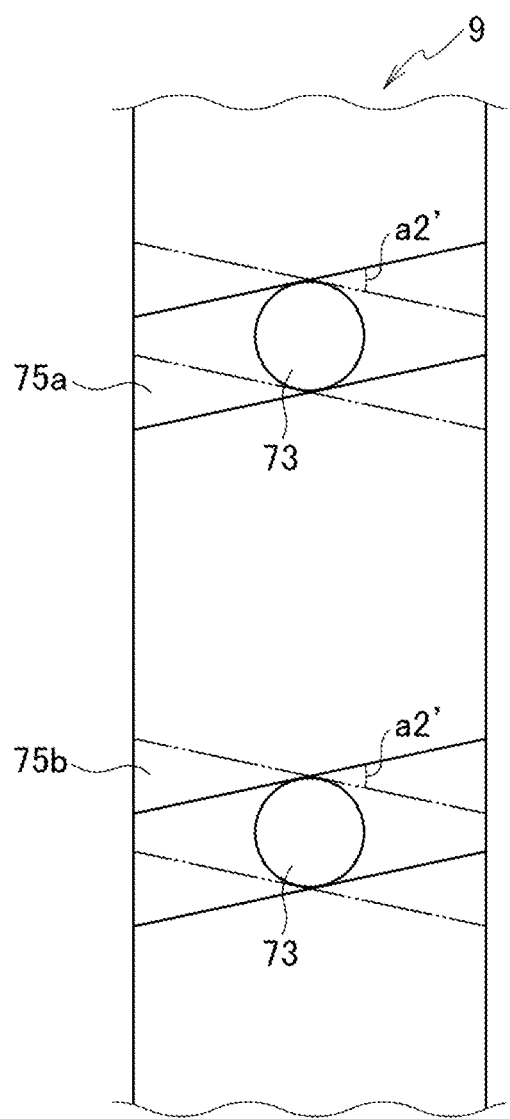
FIG. 8B is a schematic plan view of a peripheral face of the clutch member, which shows a relation between grooves on the peripheral face and grooves on an internal face of the casing.

Referring to FIG. 7A in combination with FIG. 8A, a combination of the legs 69 and through holes of the casing 1 may also constitute a cam. More specifically, side faces 69S of the legs 69 and the side faces 71S of the through holes may be correspondingly slanted. Or, in place of or in addition to these oblique faces, as illustrated in FIG. 7B, applicable is a so-called ball cam in which balls 73 are interposed between the casing 1 and the clutch member 9 and are capable of rolling thereon. The balls 73 are interposed between the outer periphery of the clutch member 9 and the inner periphery of the casing 1 and as well one or both of the outer periphery and the inner periphery may have grooves 75a, 75b that retain the balls 73 therein and are make them roll thereon. The grooves 75a, 75B are oblique to the axial direction and the grooves 75a may be slanted in an opposite direction to the grooves 75b. Still further, as illustrated in FIG. 8B, the grooves on the clutch member 9 may be slanted in an opposite direction to the grooves of the casing 1. Alternatively, any proper rolling bodies may be used in place of the balls and yet further alternatively any cam mechanism other than the ball cam may be used.

Referring again to FIG. 8A, such a cam in any way generates thrust force f2 in the clutch member 9, which acts to retain the dog teeth 27, 29 in the meshing state and thus assists the actuator 31. In a case by the oblique faces, as the angle a2 of the side faces 69S, 71S to the axis C is made larger, the assisting force is more enhanced. If it is overly large however, it may give rise to some influence on the differential gear set 3. Thus the angle a2 is for example, but not limited to, 0 degree or more and 10 degrees or less. In the example shown in FIG. 8B, an angle a2' formed by the grooves on the outer periphery and the groves on the inner periphery is equivalent to or at least comparable to the angle a2.

Referring again to FIG. 8A, side faces of the dog teeth 27, 29 may be also slanted and more specifically form an angle a3 to the direction of the axis C. As the angle a3 is made larger, it generates larger thrust force f3 in a direction to promote disengagement of the dog teeth 27, 29. When the actuator 31 stops its operation and its urging force is removed, the thrust force f3 promptly disengages the dog teeth 27, 29. If the angle a3 is overly large, it gives rise to unintended disengagement. Thus the angle a3 is for example 0 degree or more and 10 degrees or less.

To promote disengagement of the dog teeth 27, 29, as well as the side faces of the dog teeth are slanted, a compressed spring 10 may be interposed between the output member 7 and the clutch member 9 for example. A coned-disc spring is for example applicable to the spring 10, or a web spring or a coil spring is instead applicable thereto. It can prevent a situation where the dog teeth 27, 29 are stuck to each other and thereby the differential lock cannot be released.

Although larger thrust force f3 is favorable to promotion of disengagement, if the thrust force f2 is smaller than the thrust force f3, it gives rise to unintended disengagement. Thus the angle a3 may be particularly related to the angle a2 and thus they are so related as to satisfy an inequality a2$a$3. If they fall within this range, assist by the cam is predominant and engagement of the dog teeth 27, 29 are thereby retained, and as well, when the urging force by the actuator 31 is removed, the dog teeth 27, 29 can promptly get disengaged.

The output member 7, on the one hand, receives reaction force f3R created by the oblique dog teeth 27, 29, which is opposing to the thrust force f1 exerted by the lugs 21. That is, supposing that the thrust reaction force f3R is extremely large, the function of the friction clutch created by the output member 7 pressed by the thrust force f1 onto the casing 1 might be impaired. In light of sufficient use of the thrust force f1 for the function of the friction clutch, the angle a1 may be particularly related to the angle a3 and thus they are so related as to satisfy an inequality a1>a3. If they fall within this range, the function of the friction clutch is assured.

Figure 9:
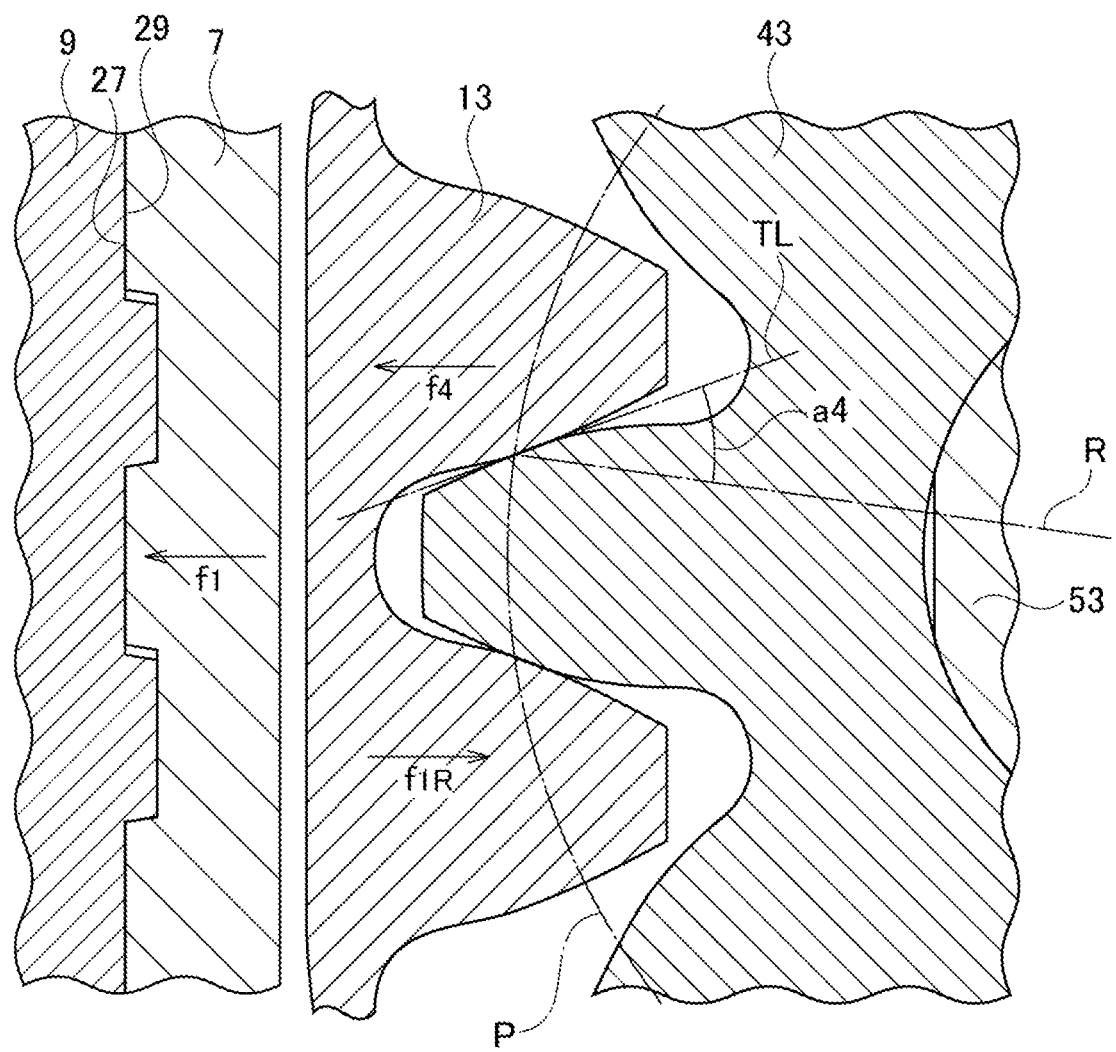
FIG. 9 is a partial plan sectional view showing a relation among the clutch member, the output member and a differential gear set, taken from the line IX-IX of FIG. 3.

As already discussed, gear engagement between the side gears 11, 13 and the pinion gears 43 also creates thrust force. Referring to FIG. 9, a tooth face of the side gear 13 and a tooth face of the pinion gear 43 meshing therewith are, on a pitch circle P, in contact with each other, and a common normal line TL of the tooth faces forms a pressure angle a4 with a radius line R. Corresponding to the pressure angle a4, it creates gear reaction force f4 that presses the side gear 13 toward the output member 7.

It may be thought, at first glance, that the gear reaction force f4 should necessarily resist the thrust reaction force f1R created on the side faces of socket 17. Discoveries made by the present inventors, however, demonstrate that this relation may not be so material. Rather, contrary to ordinary expectations, as will be discussed below, the relations with the thrust force f2 created by the cam constituted of the legs 69 and the through holes of the casing 1 have greater weight.

Referring to FIGS. 3, 4, 8 in combination with FIG. 9, the side gear 13 presses the output member 7 onto the casing 1 to put the friction clutch in operation and as well has a relationship with the clutch member 9 in which they press against each other. If the gear reaction force f4 is insufficient relative to the thrust force f2 created on the clutch member 9 by the cam, the force applied to the cone face 25 gets unstable and resultantly the function of the friction clutch may get unstable. Thus, in light of stabilization of the function of the friction clutch, the pressure angle a4 and the angle a2 may be particularly related to each other and they may be made to satisfy an inequality a4>a2 for example. If they fall within this range, the function of the friction clutch is assured.

The differential device may be further provided with a plate 67 coupled with the clutch member 9, or with any other movable member, which is led out to the exterior of the casing 1. The plate 67 may be, as illustrated in FIGS. 2 through 4, formed in a flange-like shape. By disposing a switch latching on the plate 67, or disposing a proximity sensor close to the plate 67, engagement/disengagement of the clutch can be detected from the exterior of the casing 1. Alternatively, notches may be cut in the plate, for example on its outer periphery at even intervals, and a proximity sensor may read them, thereby allowing detection of a rotating speed of the differential device.

According to the embodiments, the friction clutch pressed by the cam allows the differential device to function as a torque-sensitive LSD, and the structure in which the clutch driven by the actuator is built in the device enables differential lock. While the respective constitutional elements receive axial forces that are partly converted from the torque in respective ways and exert influence on each other, the embodiments regulate these forces respectively in preferable ranges so that the function of the friction clutch is not influenced by the operation of the clutch for differential lock. Traction of the wheels is assured in accordance with various road conditions and nevertheless the differential device can be structured to be compact and facilitate maintenance thereof.

Although certain exemplary embodiments are described above, modifications and variations of the embodiments will occur to those skilled in the art, in light of the above teachings.

The invention claimed is:

1. A differential device for delivering torque around an axis to axles, comprising:
   a casing rotatable about the axis and arranged to receive the torque;
   a differential gear set including a pinion gear and side gears in mesh with the pinion gear with a pressure angle (a4), the differential gear set being drivingly coupled with the casing to transmit the torque from the pinion gear to the side gears while allowing differential motion;
   output members respectively mediating torque transmission from the side gears to the axles, each of the output members including a friction face pressed onto an internal face of the casing to comprise a friction clutch configured to limit the differential motion and an oblique face forming a first angle (a1) with a direction of the axis, the oblique face being in mesh with a corresponding one of the side gears to constitute a cam configured to convert the torque partly into a thrust force to press the friction face onto the internal face of the casing, and one of the output members including first dog teeth;
   a clutch member movable in the direction of the axis and in combination with the one of the output members constituting a clutch to lock the differential motion, the clutch member including a leg having a side face forming a second angle (a2) with the direction of the axis, and movable dog teeth, the leg at the side face engaging with the casing to constitute a cam, each of the movable dog teeth forming a third angle (a3) with the direction of the axis; and an actuator capable of driving the clutch member toward a position where the movable dog teeth mesh with the first dog teeth, wherein the first and second angles at least satisfy an inequality a2≥a3.

2. The differential device of claim 1, wherein the first, second, and pressure angles further satisfy an inequality a1>a2 or a4>a2.

3. The differential device of claim 1, wherein each of the output members includes a hub having an inner face to be coupled with any of the axles and a flange portion spreading radially outward from the hub and having the friction face on a peripheral face of the flange portion, wherein one face of the flange portion is so dimensioned as to receive any of the side gears.

4. The differential device of claim 3, wherein the first dog teeth of the one of the output members are formed on a face opposite the oblique face that receives a corresponding one of the side gears.

5. The differential device of claim 1, wherein each of the output members includes a lug for engaging with any of the side gears and each of the side gears includes a socket for engaging with the lug, whereby a combination of the lug and the socket comprises the cam.

6. The differential device of claim 5, wherein the lug is a projection projecting radially outward from the hub and the socket is a hollow opened outward toward the direction of the axis.

7. The differential device of claim 1, further comprising:

a block sliding on the side gears to cancel out thrust reaction forces acting on the side gears.

* * * * *